(12) United States Patent
Hong et al.

(10) Patent No.: US 8,433,808 B1
(45) Date of Patent: Apr. 30, 2013

(54) LEARNING VALUES OF TRANSMISSION CONTROL PROTOCOL (TCP) OPTIONS

(75) Inventors: Xinhua Hong, Milpitas, CA (US); Hongbin Wang, San Jose, CA (US); Ying Zhang, Milpitas, CA (US); Krishna Narayanaswamy, San Jose, CA (US); Michael Luo, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 274 days.

(21) Appl. No.: 13/019,088

(22) Filed: Feb. 1, 2011

(51) Int. Cl.
*G06F 15/16* (2006.01)
(52) U.S. Cl.
USPC .......................................... 709/228; 709/230
(58) Field of Classification Search .................. 709/228, 709/230
See application file for complete search history.

(56) References Cited

U.S. PATENT DOCUMENTS

| | | | |
|---|---|---|---|
| 6,389,448 B1 * | 5/2002 | Primak et al. ................. | 718/105 |
| 6,601,101 B1 * | 7/2003 | Lee et al. ...................... | 709/227 |
| 7,581,005 B2 * | 8/2009 | Montemayor et al. ........ | 709/225 |
| 7,664,857 B2 * | 2/2010 | Ovsiannikov et al. ........ | 709/225 |
| 7,698,453 B2 * | 4/2010 | Samuels et al. ............... | 709/234 |
| 7,760,642 B2 * | 7/2010 | Plamondon .................... | 370/235 |
| 7,949,732 B1 * | 5/2011 | Roesch et al. ................. | 709/220 |
| 8,116,207 B2 * | 2/2012 | Schekochikhin et al. .... | 370/241 |
| 8,155,002 B2 * | 4/2012 | Robbins ........................ | 370/231 |
| 8,224,966 B2 * | 7/2012 | Tate et al. ..................... | 709/227 |
| 8,239,825 B2 * | 8/2012 | Boss et al. ..................... | 717/113 |
| 2008/0091812 A1 * | 4/2008 | Lev-Ran et al. .............. | 709/223 |
| 2009/0177788 A1 * | 7/2009 | Ishikawa et al. .............. | 709/228 |
| 2010/0050040 A1 * | 2/2010 | Samuels et al. ............... | 714/749 |
| 2010/0121972 A1 * | 5/2010 | Samuels et al. ............... | 709/231 |
| 2011/0185073 A1 * | 7/2011 | Jagadeeswaran et al. .... | 709/228 |

\* cited by examiner

*Primary Examiner* — Patrice Winder
*Assistant Examiner* — Eyob Hagos
(74) *Attorney, Agent, or Firm* — Harrity & Harrity, LLP

(57) ABSTRACT

A system includes a storage device and a processor. The storage device is configured to store a first set of values of TCP options for a first group of servers. The processor is configured to: transmit first requests to the first group of servers; receive first replies, in response to the first requests, from the first group of servers; determine the first set of values of the TCP options for the first group based on values in the first replies; store the first set of values in the storage device; receive a first message from a client to establish a connection between the client and a server in the first group of servers, and transmit, in response to the first message, a second message to the client.

16 Claims, 6 Drawing Sheets

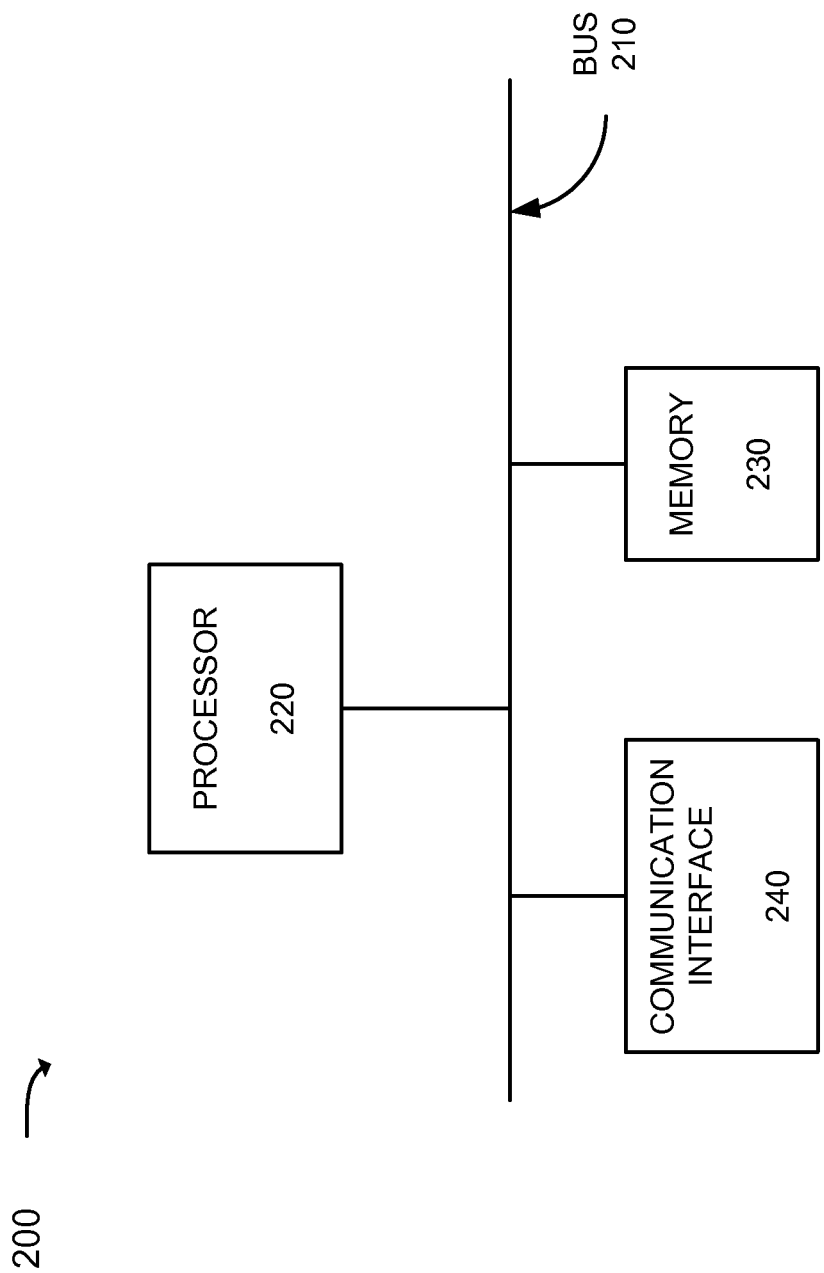

| BIT OFFSET | BITS 0-3 | BITS 4-7 | BITS 8-15 | BITS 16-31 |
|---|---|---|---|---|
| 0 | SOURCE PORT | | | DESTINATION PORT |
| 32 | SEQUENCE NUMBER | | | |
| 64 | ACKNOWLEDGMENT NUMBER | | | |
| 96 | DATA OFFSET | RES | FLAGS | WINDOW SIZE |
| 128 | CHECKSUM | | | URGENT POINTER |
| 160 | TCP OPTIONS | | | |
| 160/192+ | DATA | | | |

FIG. 3A

LEARNING VALUES OF TRANSMISSION CONTROL PROTOCOL (TCP) OPTIONS

BACKGROUND

Growth of network traffic, complexity of networks, and customer demands have increased the need to improve network performance/optimization. To do so, various Transmission Control Protocol (TCP) options are used for communication with/between servers that provide TCP services in order to improve network utilization and throughput (average rate of successful message delivery) and reduce latency and errors. TCP options are meant to provide information about a server's capabilities related to receiving data through a network. A client may transmit data to the server based on values of the TCP options. A network device provides the values of the TCP options to the client. Currently, vendors of network devices configure the values of TCP options. As a result, clients receive the same static values that are configured for the TCP options on the device whenever the clients attempt to connect to any server through the device (i.e., regardless of which particular server the clients attempt to connect). Configuring static values of the TCP options on network devices does not permit adjustment of values of TCP options when connecting with different servers and/or adjustment of values of the TCP options to account for evolving capabilities of servers.

Most vendors configure values of TCP options in a relatively conservative manner (i.e., the values reflect capabilities that are worse than those of most servers). When TCP options are configured in a conservative manner, network traffic fails to fully utilize a network's bandwidth. As a result, the performance of the network is sub-optimal (i.e., traffic is transmitted at a slower rate than possible through the network). Alternatively, vendors may configure values of TCP options in a relatively aggressive manner (i.e., the values reflect capabilities that are better than those of most servers). In these cases, connections fail when clients attempt to send data based on the aggressive values to servers that have worse capabilities than those reflected by the aggressive values (i.e., servers fail to receive data from the clients).

SUMMARY

According to one aspect, a method may include: receiving, by a network device, a first message from a first server of a group; receiving, by the network device, a second message from a second server of a group; determining, by the network device, a set of values of Transmission Control Protocol (TCP) options for the group based on the first message and the second message; receiving, by the network device, a synchronization (SYN) message from a client; and transmitting, by the network device, a synchronization-acknowledgment (SYN-ACK) message to the client in response to the SYN message. The SYN message may include a request to establish a connection between the client and the first server, and the SYN-ACK message may include the set of values of the TCP options for the group.

According to another aspect, a non-transitory computer-readable medium may store a program for causing a processor to perform a method. The method may include: sending synchronization (SYN) messages to servers; receiving synchronization-acknowledgment (SYN-ACK) messages from the servers; receiving a request message from a client; determining which one of the servers is a target of the client based on the request message; generating a reply message; and transmitting the reply message to the client. Each one of the SYN-ACK messages may include values of Transmission Control Protocol (TCP) options associated with one of the servers. The reply message may include a set of values associated with the target, where the set of values may be based on the values of the TCP options.

According to yet another aspect, a device may include a storage device and a processor. The storage device may store a first set of values of TCP options for a first group of servers. The processor may: transmit first requests to the first group of servers; receive first replies, in response to the first requests, from the first group of servers; determine the first set of values of the TCP options for the first group based on values in the first replies; store the first set of values in the storage device; receive a first message from a client to establish a connection between the client and a server in the first group of servers, and transmit, in response to the first message, a second message to the client. The second message may include the first set of values.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram of example components of one or more of the devices of FIG. 1;

FIG. 3A is a diagram of example fields of a TCP message capable of being utilized in the environment of FIG. 1;

DETAILED DESCRIPTION

The following detailed description refers to the accompanying drawings. The same reference numbers in different drawings may identify the same or similar elements.

The term "data," as used herein, may refer to and be used interchangeably with message, packet, request, reply, response, ping, traffic, datagram, or cell; a fragment of a packet, a fragment of a datagram, a fragment of a cell; or another type, arrangement, or packaging of data.

TCP may allow the exchange of data between a client and a server that are connected to a network. To do so, a network device (e.g., a device with a server load balancing (SLB) module, a packet forwarding engine (PFE) device, etc.) of the network may facilitate establishing a connection between the client and the server through a handshake process. The client may transmit a synchronization (SYN) message (as a request) to establish a connection with the server. Herein, a target may refer to a server with which the client attempts to establish a connection with. The network device may generate and transmit a synchronization-acknowledgment (SYN-ACK) message (as a reply) in response to the SYN message. The SYN-ACK message may include parameters for values of TCP options (e.g., a maximum segment size (MSS), a window scaling (WS), a selective acknowledgment (SACK) indicator, etc.). Thereafter, the network device may transmit a SYN message to the server. After the network device receives a SYN-ACK message from the server in response to the SYN message, a connection may be established between the client and the server. The client may transmit data to the server based on the received values of the TCP options.

An implementation, described herein, may provide dynamic self-learning of TCP options. Before a network device receives a SYN message to establish a connection with a server, the network device may transmit SYN messages to a group of servers as requests for values of TCP options for the servers in the group. The network device may receive a different SYN-ACK message from each server in the group in response. Each one of the SYN-ACK messages may include values of TCP options for/from the server sending the SYN-ACK message. The network device may determine values of TCP options for the group based on the SYN-ACK messages. When the network device receives a SYN message from the client to establish a connection with one of the servers in the group, the network device may generate a SYN-ACK message. The SYN-ACK message may include parameters for values of TCP options based on the determined values. The network device may transmit the SYN-ACK message to the client as a reply to the SYN message.

Figure 1:
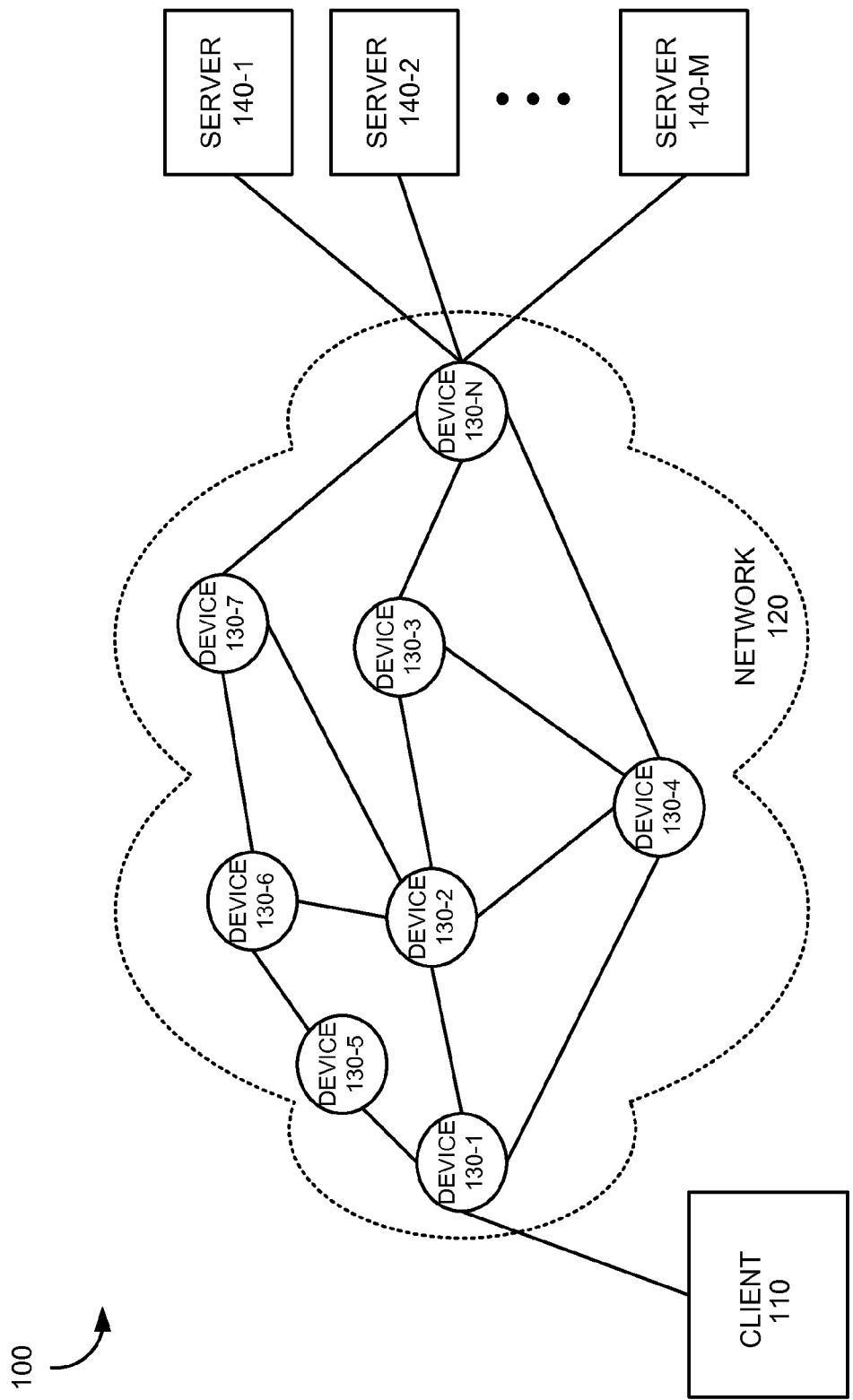
FIG. 1 is a diagram of an example environment in which systems and/or methods described herein may be implemented.

FIG. 1 is a diagram of an example environment 100 in which systems and/or methods described herein may be implemented. Environment 100 may include a client 110, a network 120, and servers 140-1, 140-2, . . . , 140-M (collectively referred to as "servers 140" and individually as "server 140"). Network 120 may include network devices 130-1, 130-2, . . . , 130-N (collectively referred to as "devices 130" and individually as "device 130"). Elements of environment 100 may interconnect via wired and/or wireless connections. In practice, environment 100 may include additional elements, fewer elements, different elements, or differently arranged elements than are shown in FIG. 1. Alternatively, or additionally, one or more elements of environment 100 may perform the tasks described as being performed by one or more other elements of environment 100.

Each one of client 110 and server 140 may represent any device capable of transmitting and/or receiving data to/from network 120. In one implementation, client 110 and/or server 140 may take the form of a computer, a switch, a smart phone, a personal computer, a laptop computer, a handheld computer, a portable communication device (e.g., a mobile phone), an access point base station, etc. Client 110 and/or server 140 may connect to network 120 directly or indirectly through, for example, a router, a switch, a bridge, a firewall, a gateway, etc. Client 110 and/or server 140 may be part of network 120 and may operate as device(s) 130. Client 110 may allow a user to prompt client 110 to transmit data to server 140. Each one of servers 140 may belong to a different group of servers 140. Each group of servers 140 may include one or more servers 140.

Network 120 may represent a single network, multiple networks of a same type, or multiple networks of different types. For example, network 120 may include a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

Devices 130 may connect via a number of network links. The network links may include wired and/or wireless links. Each device 130 may connect to one or more other devices 130. While FIG. 1 shows a particular number and arrangement of devices 130, network 120 may include additional, fewer, different, or differently arranged devices 130 than are illustrated in FIG. 1. As stated above, device 130 may represent client 110 and/or server 130.

Device 130 may include a network device that transmits data traffic. For example, device 130 may take the form of a routing device, a switching device, a multiplexing device, or a device that performs a combination of routing, switching, and/or multiplexing functions. In one implementation, device 130 may be a digital device. In another implementation, device 130 may be an optical device. In yet another implementation, device 130 may be a combination of a digital device and an optical device.

Device 130 may include a component to receive, transmit, and/or process traffic on a network link. For example, device 130 may include an Ethernet interface, an optical carrier (OC) interface, an asynchronous transfer mode (ATM) interface, or another type of interface. Device 130 may manage a set of one or more input ports via which data can be received, a set of one or more output ports via which data can be transmitted, and/or a set of one or more input/output ports via which data can be received and transmitted.

Device 130 may perform certain operations on incoming and/or outgoing data, such as decapsulation, encapsulation, demultiplexing, multiplexing, queuing, etc. operations, that may facilitate the processing and/or transportation of incoming and/or outgoing data. In one implementation, device 130 may function as a node on a network link in network 120 (e.g., an ingress node, an intermediate node and/or an output node), may receive data, may perform operations on data (e.g., append, remove, reroute, and/or other operations), and may transmit data to other devices 130.

Device 130 may perform other operations on incoming and/or outgoing data. For example, device 130 may perform data integrity operations on incoming and/or outgoing data. In another example, device 130 may perform incoming data buffering operations that may include performing data segmentation operations (e.g., breaking the data into cells (e.g., segments)), generating data control information to manage data during buffering operations, and/or storing data and control information, etc. In yet another example, device 130 may perform outgoing data buffering operations that may include retrieving data control information and/or performing data integrity operations. Additionally, or alternatively, device 130 may, from the data control information, retrieve data cells, reassemble the data cells into outgoing data, and transmit outgoing data in accordance with data forwarding information.

Client 110 may allow a user to instruct client 110 to transmit data to server 140. One or more of device 130 may establish connection(s) between client 110 and server 140. Devices 130 may facilitate transmission of the data after establishing the connection(s). One or more of devices 130 may act as client 110 and/or server 140 at one or more times during the establishing of the connections and/or the transmitting of the data.

FIG. 2 is a diagram of example components of a device 200 that may correspond to one or more of client 110, devices 130, and servers 140. Each one of client 110, devices 130, and servers 140 may include one or more devices 200. As shown in FIG. 2, device 200 may include a bus 210, a processor 220, a memory 230, and a communication interface 240. In another implementation, device 200 may include additional components, fewer components, different components, or differently arranged components than are shown in FIG. 2. For example, device 200 may include input ports, output ports, and/or a switching mechanism.

Bus 210 may include a path that permits communication among the components of device 200. Processor 220 may include a processor, microprocessor, or processing logic that may interpret and execute instructions. Memory 230 may include a random access memory (RAM), a read only memory (ROM) device, a magnetic and/or optical recording medium and its corresponding drive, and/or another type of static and/or dynamic storage device that may store information and instructions for execution by processor 220. Communication interface 240 may include any transceiver-like mechanism that enables device 200 to communicate with other devices and/or networks. For example, communication interface 240 may include a network card, such as a network interface card (NIC) and/or an Ethernet device, such as an Ethernet NIC.

Device 200 may perform certain operations, as described in detail below. Device 200 may perform these operations in response to processor 220 executing software instructions (e.g., computer program(s)) contained in a computer-readable medium, such as memory 230, a secondary storage device (e.g., hard disk, CD-ROM, etc.) or other forms of RAM or ROM. A computer-readable medium may be defined as a non-transitory memory device. A memory device may include memory space within a single physical memory device or spread across multiple physical memory devices.

The software instructions may be read into memory 230 from another computer-readable medium, such as a data storage device, or from another device via communication interface 240. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

FIG. 3A is a diagram of example fields of a TCP message 300. Each one of SYN messages and SYN-ACK messages may be in a form of TCP message 300. As shown in FIG. 3A, TCP message 300 may include, for example, one or more of the following fields: a source port field, a destination port field, a sequence number field, an acknowledgement number field, a data offset field, a reserved (RES) field, a flags field, a window size field, a checksum field, an urgent pointer field, a TCP options field, and a data field. In practice, TCP message 300 may include additional fields, fewer fields, different fields, or differently arranged fields than are shown in FIG. 3A. For example, a SYN message, in a form of TCP message 300, may not include the TCP options field.

The source port field may identify the sending port. The destination port field may identify the receiving port. The sequence number field may have two roles depending on whether a SYN flag (identified below) is present. When the SYN flag is present, the sequence number field may store an initial sequence number (ISN). When the SYN flag is not present, the sequence number field may store the sequence number for the first data byte. The acknowledgement number field may identify the next expected byte that the receiver is expecting. The data offset field may specify the size of the TCP header and, thus, the start of the TCP data field. The reserved (RES) field may be reserved for future use.

The flags field may store eight one bit control flags. For example, the flags field may include a congestion window reduced (CWR) field, an ECN-Echo (ECE) field, an urgent (URG) field, an acknowledgment (ACK) field, a push (PSH) field, a reset (RST) field, a synchronize (SYN) field, and a finish (FIN) field. The CWR field may store a flag that may be set by the sender to indicate that the sender received TCP message 300 with the ECE flag set. The ECE field may store a flag that may indicate whether the sender/receiver is ECN capable. The URG field may store a flag that indicates whether the urgent pointer field is valid. The ACK field may store a flag that indicates whether the acknowledgment number field is valid. The PSH field may store a flag that indicates to the receiver that the receiver should push all of the buffered data to the receiving application. The RST field may store a flag that indicates to the receiver whether the connection is to be reset. The SYN field may store a flag that is set for initial messages of a TCP connection where both the receiver and the sender have to synchronize their buffers. The FIN field may store a flag that indicates that the sender will not be sending any more data.

The window size field may identify the number of bytes (beyond the sequence number in the acknowledgment field) that the receiver is currently willing to receive. The checksum field may include data for error-checking of the TCP header and the TCP data. The urgent pointer field may include an offset from the sequence number indicating the last urgent data byte.

Figure 3B:
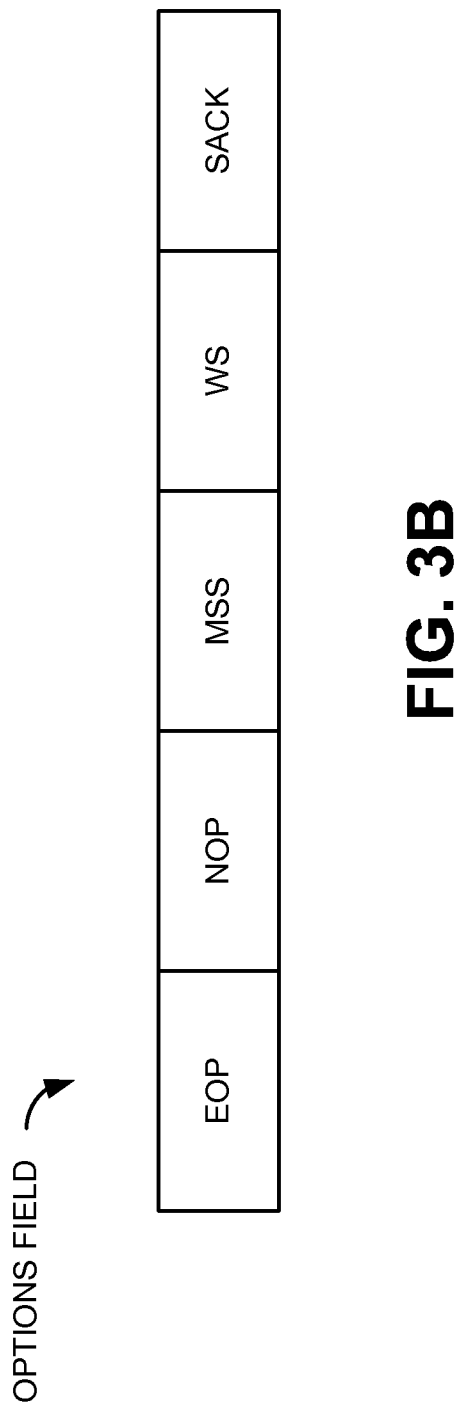
FIG. 3B is a diagram of an example option field of the TCP message of FIG. 3A.

As shown in FIG. 3B, the TCP options field may include an end of options (EOP) field, a no operations (NOP) field, a maximum segment size (MSS) field, a window scale (WS) field, and a selective acknowledgment (SACK) field. The EOP field may store data to indicate the end of the options. The NOP field may be used as padding. The MSS field may store a value that specifies the maximum message size that the sender would like to receive. The WS field may store a value to indicate whether a value in the window size may be increased. For example, the WS field value may equal a number (e.g., between 0 (no shift) to 14) that indicates a number of bits to left-shift the window size field. The SACK field may store a value that indicates whether selective acknowledgments are permitted.

Returning to FIG. 3A, the data field may store the payload, or data portion, of TCP message 300. The payload may be any of a number of application layer protocols, such as Hypertext Transfer Protocol (HTTP), Telnet, Secure Shell (SSH), and File Transfer Protocol (FTP).

Figure 4:
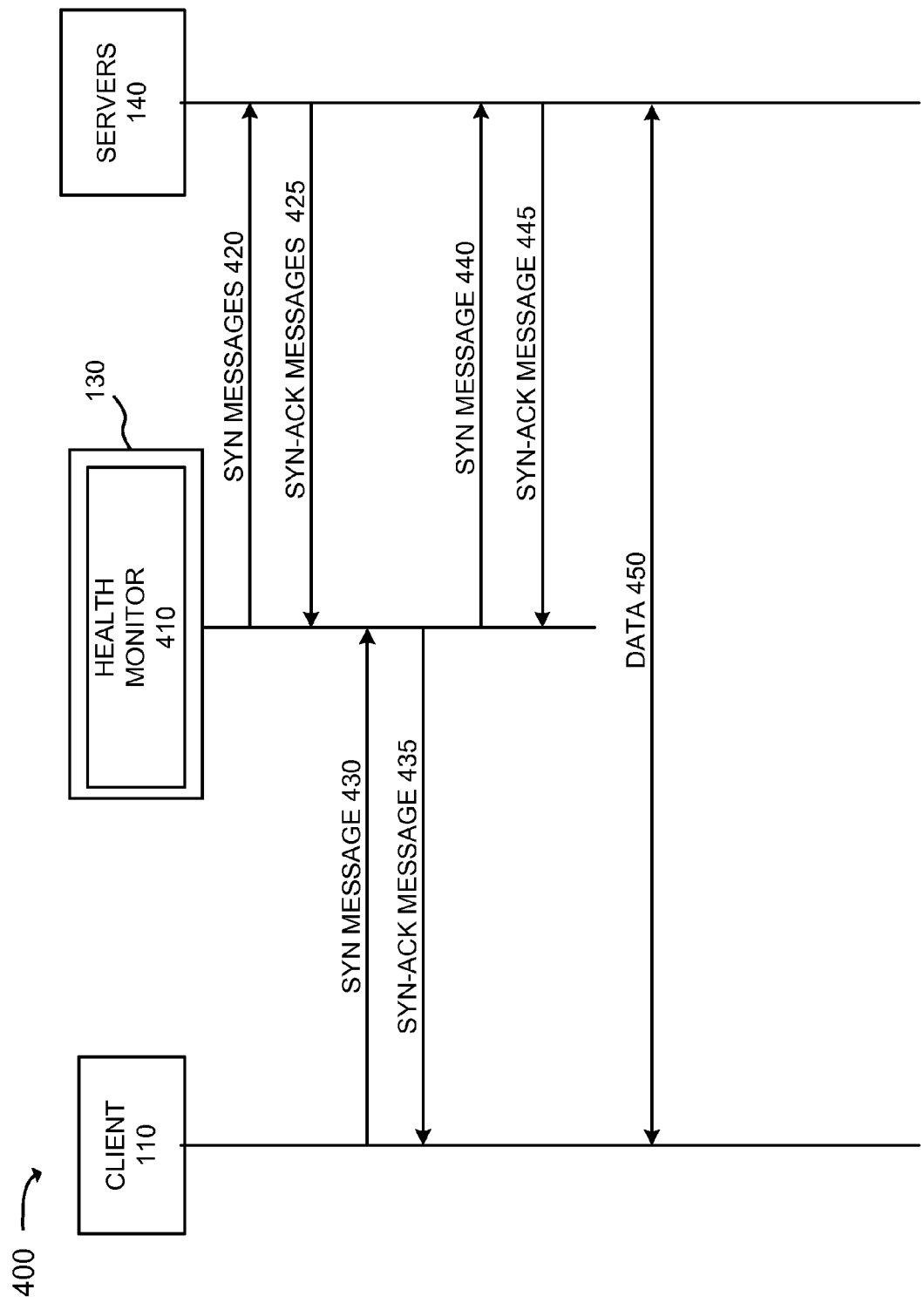
FIG. 4 is a diagram illustrating an example of dynamically self-learning values of TCP options.

FIG. 4 is a diagram illustrating an example of dynamically self-learning values of TCP options. As shown in FIG. 4, device 130 may include a health monitor 410. Health monitor 410 may represent and/or be used interchangeably with any process, any computer program, and/or any application (e.g., a daemon) that may facilitate learning values of TCP options. Health monitor 410 may implement a process for dynamically self-learning the values of the TCP options (e.g., MSS, SACK, WS, etc.). Herein, any reference to device 130 may refer to health monitor 410. Device 130 may include one or more health monitors 410. Each health monitor 410 may learn values of TCP options for particular servers 140 and/or groups of servers 140. Therefore, herein, any reference to device 130 may refer to a particular health monitor 410 of device 130. Further, any reference to servers 140 and/or one or more group of servers 140 that are connected to device 130 may refer to servers 140 and/or one or more group of servers 140 that are assigned to health monitor 410.

Assume that servers 140 are connected to device 130. Device 130 may proceed to execute a process for learning values of TCP options associated with servers 140. Servers 140 may include one or more groups of servers 140. For example, server 140-1, server 140-2, and server 140-3 may form a first group of servers 140; server 140-4 and server 140-5 may form a second group of servers 140; server 140-6, server 140-7, and server 140-8 may form a third group of servers 140; etc. Herein, a group of servers 140 may refer to a virtual server and the servers in the group may refer to a set of physical servers associated with the virtual server.

Device 130 may generate SYN messages 420. Device 130 may transmit SYN messages 420 to servers 140. SYN messages 420 may include the most aggressive (maximum) possible values for TCP options. Each one of servers 140 may receive a different one of SYN messages 420. For example, server 140-1 may receive one of SYN messages 420. Server 140-1 may generate a SYN-ACK message 425 in reply to the one of SYN messages 420. The generated SYN-ACK message 425 may include values of TCP options associated with server 140-1 (e.g., a value of "1.5 K" for MSS of server 140-1, a value of "5 blocks" for SACK of server 140-1, and a value of "2" for WS of server 140-1). Servers 140 may transmit generated SYN-ACK messages with values of TCP options as SYN-ACK messages 425 (individually referred to as "SYN-ACK message 425"). The values of the TCP options included in SYN-ACK message 425 may represent TCP options that servers 140 may handle (e.g., configuration(s) of an operating system (OS) of server 140. In other words, the values of the TCP options in SYN-ACK messages 425 may be more conservative (smaller) than the maximum possible values, which are included in SYN messages 420.

Device 130 may receive SYN-ACK messages 425 from servers 140. Device 130 may determine values of TCP options for each group of servers based on SYN-ACK messages 425, which are received in response to SYN messages 420. For example, device 130 may determine a first set of values of TCP options for the first groups based on SYN-ACK message 425 received from server 140-1, SYN-ACK message 425 received from server 140-2, and SYN-ACK message 425 received from server 140-3. To determine a group value, in a set of values for a group, of one of the TCP options, device 130 may select the most conservative value from the values included for the one of the TCP options in SYN-ACK messages 425, which are received from a particular group of servers 140 (e.g., the first group of servers).

Assume that client 110 desires to establish a TCP connection with one of servers 140 (e.g., server 140-1) or a group of servers (e.g., the first group of servers 140). Client 110 may transmit SYN message 430 to connect with server 140. Device 130 may intercept SYN message 430. Device 130 may determine based on SYN message 430 (e.g., based on an Internet Protocol (IP) destination address specified in the destination port field of SYN message 430) with which group of servers 140 that client 110 wants to connect. For example, assume that the device 130 determines that the client 110 wants to connect with server 140-1. Device 130 may determine that client 110 wants connect with the first group of servers because server 140-1 is in the first group of servers. Device 130 may retrieve the values of TCP options, which are associated with (determined for) servers 140 in the first group. Device 130 may generate a SYN-ACK message 435 with the retrieved values of TCP options as parameters. Device 130 may transmit SYN-ACK message 435 to client 110.

Thereafter, device 130 may generate a SYN message 440. Device 130 may send SYN message 440 to server 140. Server 140 may receive SYN message 440 from device 130. Assume that server 140 determines to establish a connection with client 110 based on SYN message 440 acting as a connection request. As a result, server 140 may generate a SYN-ACK message 445 that server 140 may send to device 130/client 110. Device 130 may receive/intercept SYN-ACK message 445. Thereafter, a connection may be established between client 110 and server 140-1. Client 110 may transmit data 450 to server 140-1 based on values of TCP options that are in SYN-ACK message 435. Device 130 may forward data 450 to server 140-1. Device 130 may also receive data from server 140-1 and forward data 450 to client 110

Figure 5:
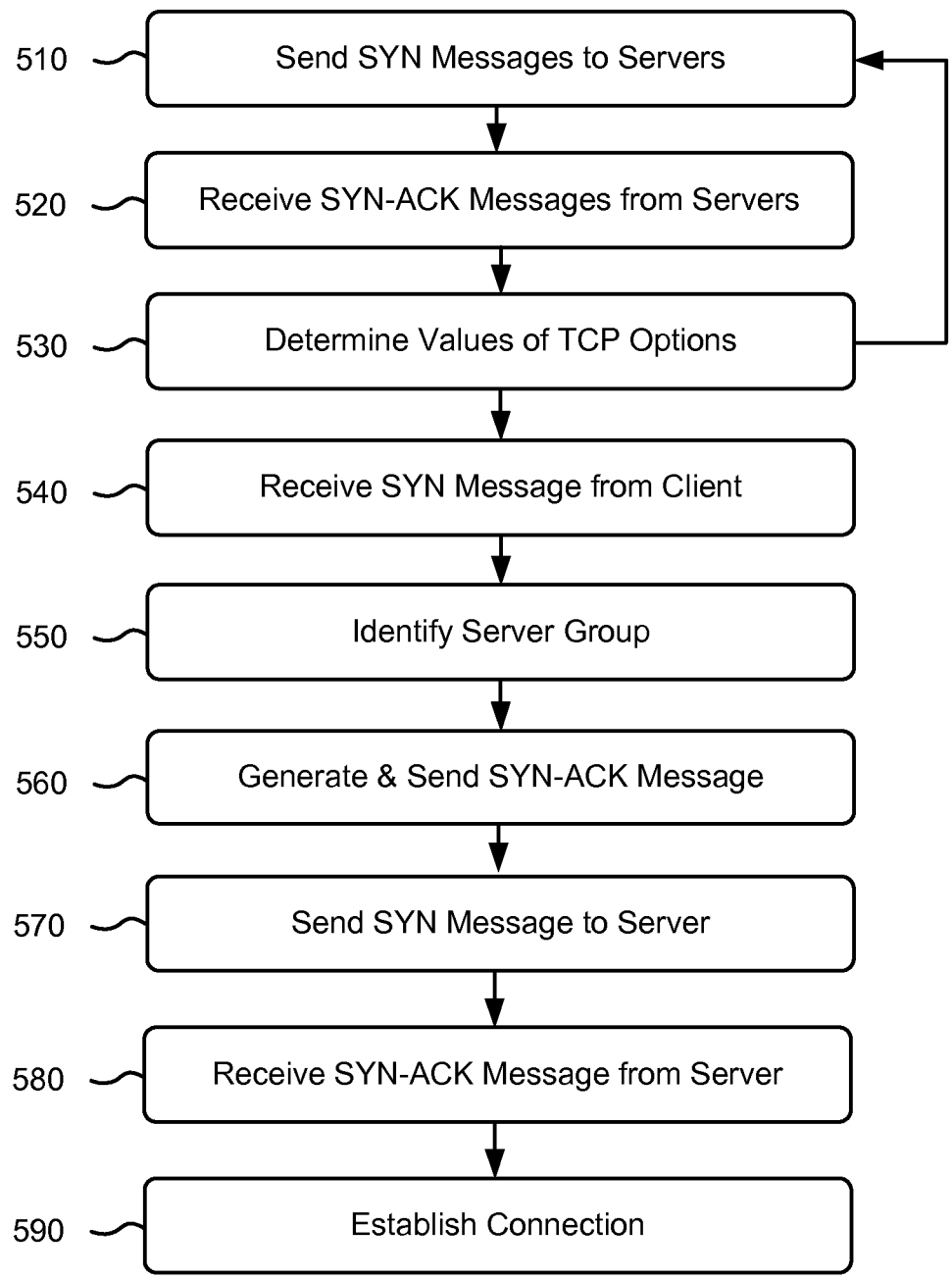
FIG. 5 is a flowchart of an example process for self-learning values of TCP options.

FIG. 5 is a flowchart of an example process 500 for self-learning values of TCP options. In one implementation, device 130 may perform process 500. In another implementation, some or all of process 500 may be performed by a device separate from or in combination with device 130.

As shown in FIG. 5, process 500 may include sending SYN messages 420 to servers 140 (block 510). For example, in one implementation, device 130 may send SYN messages 420 to servers 140 on a periodic basis. An administrator of device 130 may configure a defined period of time during which to resend SYN messages 420 to (re-)learn updated values of TCP options. Device 130 may keep track of amount of time since the last SYN messages were sent. Device 130 may determine that the defined period of time elapsed (i.e., when the tracked amount of time equals the defined period of time). When the defined period of time elapses, device 130 may resend SYN messages 420 to servers 140. In another implementation, device 130 may resend to different groups of servers based on different defined periods of times. For example, device 130 may send SYN messages 420 to a first group of servers 140 every first period of time, device 130 may send SYN messages 420 to a second group of servers 140 and/or a third group of servers 140 every second period of time, etc.

In yet another implementation, device 130 may send SYN messages 420 to one or more of servers 140 when one or more other predefined events occur for prompting (re-) learning values of TCP options for servers 140. For example, a condition may specify for device 130 to send SYN messages 420 when a state of a server 140 changes to an up state from a down state. The state of server 140 may change to an up state from a down state, for example, when server 140 is turned-off and rebooted. When device 130 determines that the condition is met for transmitting SYN messages 420, device 130 may transmit SYN message(s) 420 to server 140 (which met the condition), to all servers 140 in the same group as server 140, and/or to all servers 140 connected to device 130.

Device 130 may send SYN messages 420 based on most aggressive (maximum) possible values for TCP options. Servers 140 may return SYN-ACK messages 425 with values for TCP options that are more conservative (smaller than the maximum), as described further below. The values of the TCP option may specify what servers 140 may handle (e.g., based on configurations of OSs of servers).

SYN-ACK messages 425 may be received from the servers (block 520). For example, server 140-1 may receive one of SYN messages 420 from device 130. SYN message 420 may prompt server 140-1 to generate one of SYN-ACK messages 425 in order for server 140-1 to connect with client 110. Server 140-1 may generate one of SYN-ACK messages 425 based on values of TCP options for server 140-1. Similarly, server 140-2 may generate one of SYN-ACK messages 425 based on values of TCP options for server 140-2, server 140-3 may generate one of SYN-ACK messages 425 based on values of TCP options for server 140-3, etc. Servers 140 that received SYN messages 420 may generate SYN-ACK messages 425 and transmit SYN-ACK messages 425 to device 130. Device 130 may receive SYN-ACK messages 425 from servers 140, which received SYN messages 420 from device 130.

Values of TCP options may be determined (block 530). For example, device 130 may determine a set of values of TCP options for each group of servers 140, which are connected to device 130, based on SYN-ACK messages 425 received from servers 140 in the groups. Assume that server 140-1, server 140-2, and server 140-3 form a first group of servers 140. Device 130 may receive SYN-ACK message 425 from server 140-1 with the following values of TCP options: "1 K" for MSS, "5 blocks" for SACK, and "2" for WS. Device 130 may receive SYN-ACK message 425 from server 140-2 with the following values of TCP options: "1.5 K" for MSS, "4 blocks" for SACK, and "3" for WS. Device 130 may receive SYN-ACK message 425 from server 140-3 with the following values of TCP options: "2 K" for MSS, "4.5 blocks" for SACK, and "4" for WS. Device 130 may determine a first set of values of TCP options for the first group of servers 140 by selecting smallest/most conservative values of each TCP options based on the values in SYN-ACK messages 425 received from server 140-1, server 140-2, and server 140-3, which make up the first group of servers 140. Accordingly, device 130 may determine the following a first set of values of TCP options for the first group of servers 140: "1 K" for MSS, "4 blocks" for SACK, and "2" for WS.

Assume that server 140-5 and server 140-6 form a second group of servers 140. Device 130 may determine a second set of values of TCP options for the second group of servers 140 by selecting smallest or most conservative values of each TCP options based on the values in SYN-ACK messages 425 received from server 140-5 and server 140-6. For example, device 130 may determine the following second set of values of TCP options for the second group of servers 140: "3 K" for MSS, "6 blocks" for SACK, and "4" for WS. Device 130 may repeat the process for determining group values of TCP options for each group of servers 140 connected to device 130. Device 130 may store the different sets of values of TCP options for the different groups of servers 140. Device 130 may store each one of the sets of values in association with an identifier of one the different groups of servers 140. Device 130 may retrieve one of the sets of values of TCP options, based on a determined identifier of a particular group of servers 140, when client 110 wants to establish a connection with server 140, which is in the particular group of servers 140. Client 110 may use the retrieved set of values of TCP options when transmitting data 450 to a destination server 140 associated with the retrieved set of values.

Process 500 may send new SYN messages 420 to the servers 140 (block 510), after determining values of TCP options (block 530), whenever a defined period of time elapses and/or a predefined events occurs, as described above with reference to block 510. Thereafter, device 130 may determine an updated set of values of TCP options based on new SYN-ACK messages 425 that are received in reply to new SYN messages 420.

SYN message 430 may be received from a client (block 540). For example, client 110 may want to establish a connection with server 140-1. Client 110 may generate SYN message 430. SYN message 430 may include a TCP message that indicates that client 110 wants to establish the connection with server 140-1. SYN message 430 may include an IP address of server 140-1 or an IP address associated with a first group of servers 140, which includes server 140-1. Client 110 may transmit SYN message 430 to server 140-1 and/or device 130. Device 130 may receive SYN message 430 from client 110 (e.g., device 130 may receive SYN message 430 by intercepting SYN message 430 when SYN message 430 is sent to establish a connection with server 140-1).

A server group may be identified (block 550). For example, device 130 may determine that SYN message 430 is a TCP message for establishing a connection with server 140. Device 130 may look at destination port field of SYN message 430 to determine an IP address of server 140-1 with which client 110 wants to establish a connection. Device 130 may identify a group of servers 140 by determining that server 140-1 is in the first group of servers 140. Identifying the first server group may include determining an identifier of (associated with) the first group based on an IP address of server 140-1 (i.e., the destination IP address).

A SYN-ACK message 435 may be generated and sent (block 560). For example, device 130 may retrieve a first set of values for the first group of servers 140 based on the determined identifier. Device 130 may generate SYN-ACK message 435 based on the retrieved first set of values. SYN-ACK message 435 may include, for example, parameters for the following group values, in the first set of values, of TCP options for the first group of servers 140: "1 K" for MSS, "4 blocks" for SACK, and "2" for WS. Device 130 may send SYN-ACK message 435 to client 110 as a reply to SYN message 430. SYN-ACK message 435 may include a number (e.g., "3" ("2"+1)) in an acknowledgement number field that is related to a number (e.g., "2") in a sequence number field of SYN message 430. Client 110 may receive SYN-ACK message 435. Client 110 may configure itself to transmit data 450 to server 140, after the connection is established, based on the first set of values of TCP options in SYN-ACK message 435.

A SYN message 440 may be sent to server (block 570). For example, after transmitting SYN-ACK message 435 to client 110, device 130 may send SYN message 440 to server 140-1. SYN message 440 may include a TCP message. SYN message 440 may include information to request for server 140-1 to establish a connection with client 110.

A SYN-ACK message 445 may be received (block 580). For example, server 140-1 may receive SYN message 440. Server 140-1 may determine whether to establish a connection with client 110 based/in response to SYN message 440. Server 140-1 may generate SYN-ACK message 445 as a reply to SYN message 440. SYN-ACK message 445 may include information to indicate that server 140-1 successfully determined to establish the connection with client 110. Server 140-1 may send SYN-ACK message 445 to device 130.

A connection may be established (block 590). For example, device 130 may receive SYN-ACK message 445 from server 140-1. Device 130 may determine, as a result of SYN-ACK message 445, that the process (begun due to receipt of SYN message 430) for establishing the connection between client 110 and server 140-1 is complete. Device 130 may transmit additional acknowledgement (ACK) messages to client 110 and/or server 140-1 to notify them that the connection between client 110 and server 140-1 is established. Thereafter, client 110 and server 140-1 may exchange data 450 via network 120.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

Also, reference was made throughout the description to the capabilities of the server. These references may refer to the capabilities of an application operating on the server. Likewise, any reference to the capabilities of an application operating on the server may refer to the capabilities of the server itself.

Further, while the terms "client" and "server" have been used to refer to devices, these terms may also refer to applications operating on these devices. The terms "client device"

and "server device" are intended to refer to devices and not to applications operating on these devices.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a network device, a first message from a first server of a group,
        the first message including a first value for a first Transmission Control Protocol (TCP) option and a second value for a second TCP option;
    receiving, by the network device, a second message from a second server of the group,
        the second message including a third value for the first TCP option and a fourth value for the second TCP option;
    selecting, by the network device, a first selected value for the first (TCP) option by selecting one of the first value or the third value that is smallest;
    selecting, by the network device, a second selected value for the second TCP option by selecting one of the second value or the fourth value that is smallest,
        a set of values of TCP options, for the group, including the first selected value and the second selected value;
    receiving, by the network device, a synchronization (SYN) message from a client,
        the SYN message including a request to establish a connection between the client and the first server; and
    transmitting, by the network device, a synchronization-acknowledgment (SYN-ACK) message to the client based on the SYN message,
        the SYN-ACK message including the set of values of the TCP options for the group.

2. The method of claim 1, where the TCP options comprise at least one of a maximum segment size (MSS), a window scaling (WS), or a selective acknowledgment (SACK).

3. The method of claim 1, further comprising:
    transmitting a first request to the first server,
        the first message being a reply to the first request; and
    transmitting a second request to the second server,
        the second message being a reply to the second request.

4. The method of claim 3,
    where the first request and the second request are SYN messages, and
    where the first message and the second message are SYN-ACK messages.

5. The method of claim 1, where the client transmits data to the first server based on the set of values of the TCP options.

6. The method of claim 1, further comprising:
    identifying an Internet Protocol (IP) destination address based on the SYN message;
    determining an identifier of the group based on the IP destination address;
    retrieving the set of values of the TCP options for the group based on the identifier; and
    generating the SYN-ACK message based on the set of values.

7. A non-transitory computer-readable medium storing instructions, the instructions comprising:
    one or more instructions that, when executed by at least one processor, cause the at least one processor to:
        send synchronization (SYN) messages to a particular group of servers;
        receive a first synchronization-acknowledgment (SYN-ACK) message from a first server of the particular group of servers;
        receive a second SYN-ACK message from a second server of the particular group of servers;
        determine a set of values of Transmission Control Protocol (TCP) options for the particular group of servers based on the first SYN-ACK message and the second SYN-ACK message by selecting a smallest value associated with a particular type of option from the first SYN-ACK message and the second SYN-ACK message;
        store the set of values of the TCP options in association with information identifying at least one of the first server or the second server;
        receive a request message from a client;
        determine a target of the client based on the request message,
            the target being one of the first server or the second server;
        retrieve the set of values of the TCP options based on the target;
        generate a reply message, based on the set of values of the TCP options; and
        send the reply message to the client.

8. The non-transitory computer-readable medium of claim 7, where the request message is a SYN message, and where the reply message is a SYN-ACK message.

9. The non-transitory computer-readable medium of claim 7, where the instructions further comprise:
    one or more instructions that, when executed by the at least one processor, cause the at least one processor to:
        receive a third SYN-ACK message from a third server of a different group of servers;
        receive a fourth SYN-ACK message of from a fourth server of the different group of servers;
        determine a different set of values of the TCP options for the different group of servers based on the third SYN-ACK message and the fourth SYN-ACK message;
        generate a different reply message based on the different set of values of the TCP options; and
        provide the different reply message to the client when the third server or the fourth sever is a new target of the client.

10. The non-transitory computer-readable medium of claim 7, where the instructions further comprise:
    one or more instructions that, when executed by the at least one processor, cause the at least one processor to:
    transmit an individual SYN message, after receiving the request message, to the target to request that the target establish a connection with the client;
    receive an individual SYN-ACK message, in reply to the individual SYN message, from the target; and
    facilitate transmission of data between the client and the target after receiving the individual SYN-ACK message.

11. A device comprising:
a processor to:
    transmit particular requests to a particular group of servers,
    receive particular replies from the particular group of servers,
        a first reply, of the particular replies, being from a first server of the particular group of servers,
        the first reply including a first value for a first Transmission Control Protocol (TCP) option and a second value for a second TCP option,
        a second reply, of the particular replies, being from a second server of the particular group of servers, and
        the second reply including a third value for the first TCP option and a fourth value for the second TCP option,
    select a first selected value, of a particular set of values, for the first TCP option by selecting one of the first value or the third value that is smallest,
    select a second selected value, of the particular set of values, for the second TCP option by selecting one of the second value or the fourth value that is smallest,
    store the particular set of values in a storage device,
    receive a first message from a client to establish a connection between the client and the first server, and
    transmit, based on the first message, a second message to the client,
        the second message including the particular set of values.

12. The device of claim 11,
    where, when transmitting the particular requests, the processor is further to
        transmit the particular requests to the particular group of servers when a particular condition occurs, and
    where the particular condition occurs at least when a defined period of time elapses or a status of the first server or the second server changes after a reboot.

13. The device of claim 12,
    where the particular set of values provides information for the client to use to determine how to transmit data to the first server, and
    where the first selected value comprises one of a maximum segment size (MSS) value, a window scaling (WS) value, or a selective acknowledgment (SACK) value.

14. The device of claim 11,
    where the processor is further to:
        transmit different requests to a different group of servers,
        receive different replies from the different group of servers,
        determine a different set of values for the different group of servers based on the different replies, and
        transmit the different set of values to the client to establish a different connection between the client and a different server of the different group of servers.

15. The device of claim 11, where the processor is further to:
        determine, after receiving the first message, that the first server is in the particular group of servers, and
        retrieve the particular set of values from the storage device after determining that the first server is in the particular group of servers.

16. The device of claim 11,
    where the particular requests and the first message are synchronization (SYN) messages, and
    where the particular replies and the second message are synchronization-acknowledgment (SYN-ACK) messages.

* * * * *